United States Patent [19]

Taylor

[11] Patent Number: 5,130,714
[45] Date of Patent: Jul. 14, 1992

[54] STRETCH AND CHIRP WAVEFORM FORMAT FOR REDUCED GENERATING AND RECEIVING HARDWARE COMPLEXITY

[75] Inventor: Stephen D. Taylor, Agoura, Calif.

[73] Assignee: Hughes Aircraft Company, Los Angeles, Calif.

[21] Appl. No.: 704,488

[22] Filed: May 23, 1991

[51] Int. Cl.$^5$ ............................................. G01S 13/26
[52] U.S. Cl. .................................... 342/132; 342/201
[58] Field of Search ................ 342/200, 98, 100, 201, 342/132

[56] References Cited

U.S. PATENT DOCUMENTS 5,036,327 7/1991 Dannenberg ..................... 342/98 X Primary Examiner—Mark Hellner
Attorney, Agent, or Firm—Leonard A. Alkov; Wanda K. Denson-Low

[57] ABSTRACT

Unique stretch and chirp waveform formats are described which allow significant simplification of radar signal generation and receive processing hardware. The new formats produce a non-zero intermediate frequency (IF) to facilitate in-phase and quadrature (I/Q) processing but allows the use of a homodyne type of receiver architecture. That architecture greatly simplifies the receiver hardware because the first local oscillator (LO) signal is simply a sample of the transmitter drive signal and no second LO is required. The non-zero IF is achieved by control of the timing and start frequency of the first LO waveform for stretch processing and timing of the transmit signal gating for chirp processing.

17 Claims, 4 Drawing Sheets

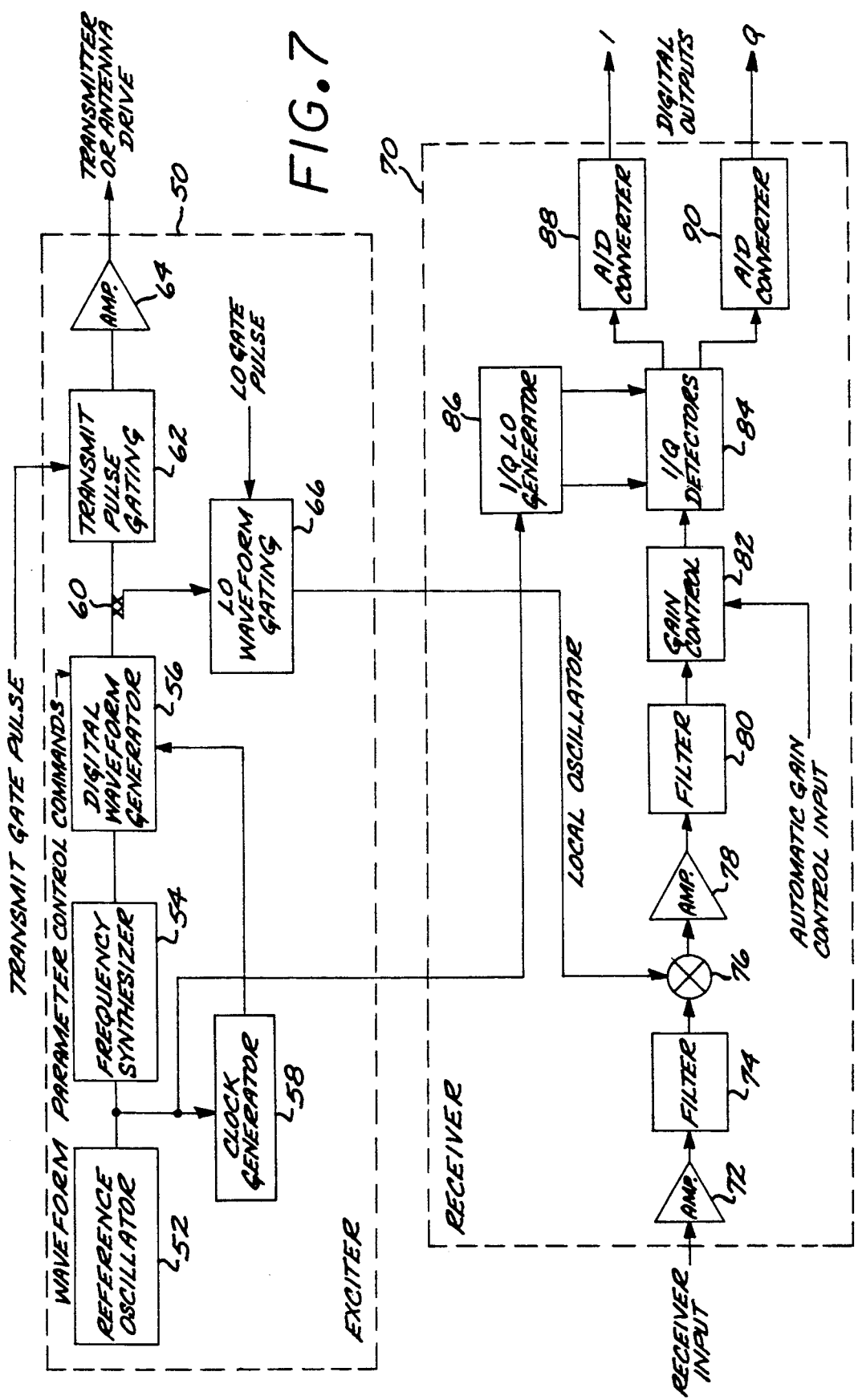

STRETCH AND CHIRP WAVEFORM FORMAT FOR REDUCED GENERATING AND RECEIVING HARDWARE COMPLEXITY

BACKGROUND OF THE INVENTION

The present invention relates to waveform formats for use in radar applications.

Previous stretch and chirp waveform formats and receiver and exciter architectures generally used the straightforward technique of generating a transmit waveform with a frequency sweep that is centered on the operating channel frequency. For stretch waveform processing, the first LO is similarly modulated but with an extended sweep time to cover the selected range swath and timed to coincide with the return signal from that swath. For chirp waveform processing, the first LO is unmodulated during the return signal processing time. A single or double conversion receiver converts the return signal to a desired final IF by mixing it with one or two LO signals at frequencies that are suitably offset from the transmit frequency and first IF. This approach requires dedicated circuity to develop the frequency offset for the first LO and to generate the second LO and also requires additional receiver processing functions for the double conversion approach. Additionally, if a frequency up or down converter is used to derive the transmit signal from the first LO or visa versa, an additional opportunity is introduced for the introduction of waveform distortions.

Typical implementations of receivers for reconnaissance radar applications that use stretch or chirp waveforms consist of a double conversion architecture to convert the microwave input signal through two IFs prior to synchronous I/Q signal detection. The double conversion process allows RD and IF filtering to provide excellent image signal and image noise rejection at each mixer but requires a substantial amount of receiver and exciter hardware to provide the two frequency conversions, generate the microwave first LO and the typically L-band or UHF second LO, and provide separate filtering in each of the two IFs. In many reconnaissance applications, however, 20 dB of image rejection is sufficient. That degree of rejection can be provided by an image rejection mixer without resorting to multiple IFs.

The present invention makes use of a single conversion receiver architecture and particular formats for the chirp and stretch waveforms to allow hardware simplification even beyond that of a conventional signal conversion receiver. The technique produces a non-zero receiver IF to allow I/Q signal detection at a reasonably low frequency but without the need for additional hardware to generate separate LO operating frequencies that are offset from the transmit frequency. Hardware space savings over conventional approaches are significant.

An additional benefit of the invention is that waveform distortion producing elements in the transmitter drive output path are eliminated. A typical current approach uses an upconverter, comprised of a microwave mixer and output bandpass filter, to derive the transmitter drive signal from a sample of the first LO. The filter functions to select the desired mixer output sideband but also introduces phase distortion on the transmit waveform which can degrade radar imaging quality.

SUMMARY OF THE INVENTION

The invention is embodied in a radar system having a transmit drive section and a receiver section, characterized in that both the transmit signal and the receiver local oscillator (LO) signal are produced on a common microwave carrier, and wherein a non-zero receiver intermediate frequency (IF) is produced, allowing signal detection at a reasonably low frequency but without the need for additional hardware to generate separate local oscillator operating frequencies that are offset from the transmit frequency. The system comprises means for generating a microwave carrier signal of frequency $f_T$, such as a reference oscillator-controlled frequency synthesizer.

A digital waveform generator modulates the carrier signal with a transmit drive waveform during periods of time in which the system is in the transmit mode, i.e., during transmit pulses, and with a LO signal waveform during other periods of time.

The system includes means for amplifying and transmitting the transmit drive waveform modulated signal during selected periods of time, i.e., to provide the transit pulses.

Means are provided for employing the LO signal waveform modulated signal during other periods of time as the receiver LO signal which is mixed with received returns from said transmitted signals to provide frequency converted receiver signals. The system includes means for processing said frequency converted receiver signals to provide receiver output signals.

In one embodiment, the transmit drive waveform comprises a stretch waveform characterized by a linear ramping frequency that begins at frequency $f_T$ and is of slope K Hz/second to a total deviation of $B_T$. In this case, the LO signal waveform can be either timed to begin $f_{IF}/|K|$ seconds before the arrival of the target returns from the center of the range swath of interest and with zero frequency offset from $f_T$, or timed to start at a time coincident with return signals from the near edge of the swath with an initial frequency offset from $f_T$ of $\pm(f_{IF}-|K|R_{SW}/c)$, where the plus (+) sign applies for K positive and the minus (−) sign for K negative, $f_{IF}$ is the desired receiver intermediate frequency, $R_{SW}$ is the range swath being mapped, and c is the speed of light. In either case, the LO signal frequency ramps from the start point at a rate of K Hz/second to the point coincident with the returns from the far edge of the swath for a total deviation of $B_{LO}$, which is greater than $B_T$.

In another embodiment, the transmit drive waveform comprises a stretch waveform characterized by a linear ramping frequency that begins at a frequency which is $B_T/2$ below the frequency $f_T$ and is of a slope K Hz/second to a total deviation of $B_T$. The transmit waveform frequency deviation is thereby centered around $f_T$. In this case, the LO signal waveform can be timed to begin coincident with the return signals from the near edge of the range swath of interest, and end following returns from the far edge of the swath, and is characterized by a linear ramping frequency that starts at an offset from $f_T$ of $\pm(f_{IF}-B_T/2-|K|R_{SW}/c)$, where the plus (+) sign applies for K positive and the minus (−) sign for K negative. Alternatively to reduce the levels of waveform starting transients, the LO waveform could be made to begin prior to the arrival of returns from the swath near edge and ramp to the start frequency rather than stepping to it.

In another embodiment, the transmit drive waveform comprises a chirp waveform, and the LO signal waveform is not modulated, so that the receiver LO is the carrier signal.

BRIEF DESCRIPTION OF THE DRAWING

These and other features and advantages of the present invention will become more apparent from the following detailed description of an exemplary embodiment thereof, as illustrated in the accompanying drawings, in which:

FIG. 7 is a block diagram of a radar receiver and exciter architecture usable with common carrier stretch and chirp waveform formats in accordance with the invention.

DETAILED DESCRIPTION OF THE PREFERRED EMBODIMENT

Figures 1, 2:
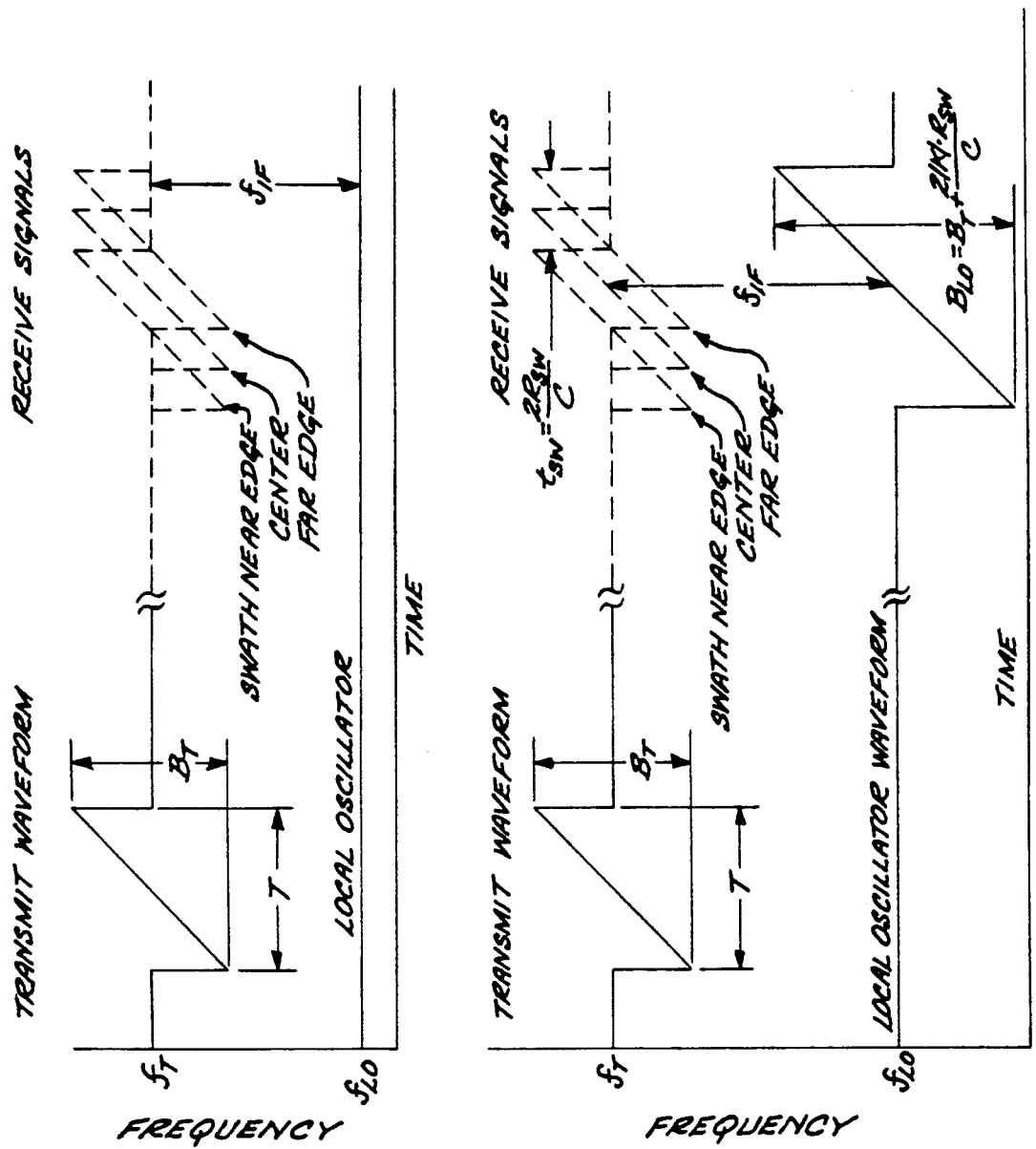
FIG. 1 is a waveform diagram illustrating a conventional chirp waveform format.
FIG. 2 is a waveform diagram illustrating a conventional stretch waveform format.

The typical chirp waveform is shown in FIG. 1. A microwave carrier signal at frequency $f_T$ is modulated to produce a centered linear ramping frequency waveform over a time duration T and a bandwidth $B_T$. That signal becomes the radar transmit signal. Target returns from point reflectors arrive at the receiver distributed in time in proportion to the individual point ranges, as also shown in FIG. 1. These returns are converted down in frequency through one or more IFs in the receiver by mixing with one or more LO signals that are suitably offset from the transmit frequency and from the first IF for a double conversion system. Synchronous I/Q detection, A/D conversion, and digital pulse compression of the returns is accomplished for some systems, while others may use analog pulse compression techniques such as those based on dispersive delay lines.

The typical stretch waveform format is shown in FIG. 2. Similar to the chirp case, the microwave transmit signal is modulated by a linear frequency ramp over a time T and a bandwidth $B_T$ that is centered on $f_T$. For stretch processing, the first LO signal to the receiver, which is offset from the transmit frequency by the first IF, is similarly modulated but with a longer sweep duration and delayed to coincide with the return from the range of interest. The range swath width, $R_{SW}$, to be processed determines the extent to which the LO waveform must exceed the transmit pulse width. Returns from point reflectors at the near edge, center, and far edge of this swath are shown in FIG. 2. The first receiver conversion removes the ramp frequency modulation and produces signals at approximately the first IF that are at constant frequency for point reflectors but offset from the nominal IF by their respective range separation from the center of the swath.

For chirp and stretch waveform processing by conventional means, receiver LO signals must be generated with frequencies that are unique from the transmit frequency. This separate LO signal generation requires substantial hardware and, in case of the stretch waveform where both the transmit signal and the first LO must carry the modulation, provides an opportunity for the introduction of additional waveform distortions. The chirp and stretch waveform formats of this invention remove the need for this extra hardware and correspondingly eliminate one potential source of waveform corruption.

NEW STRETCH WAVEFORM FORMATS

Figure 3:
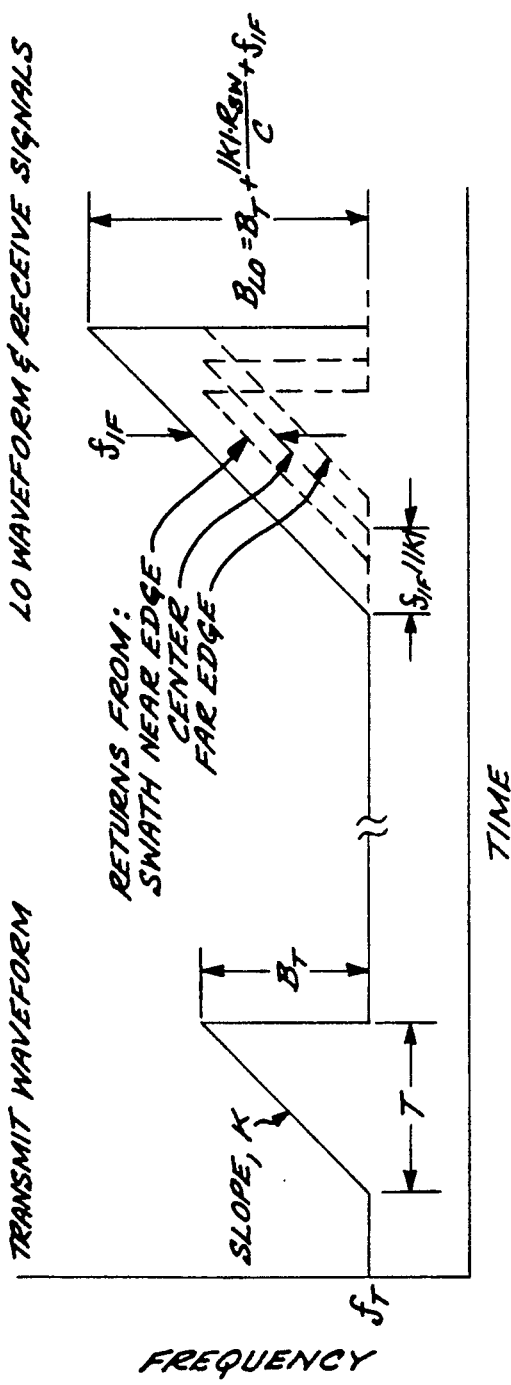
FIG. 3-5 are waveform diagrams illustrating two stretch waveform formats that have the characteristics of allowing both the transmit carrier and the LO signal to be generated on a common microwave carrier.
Figure 4:
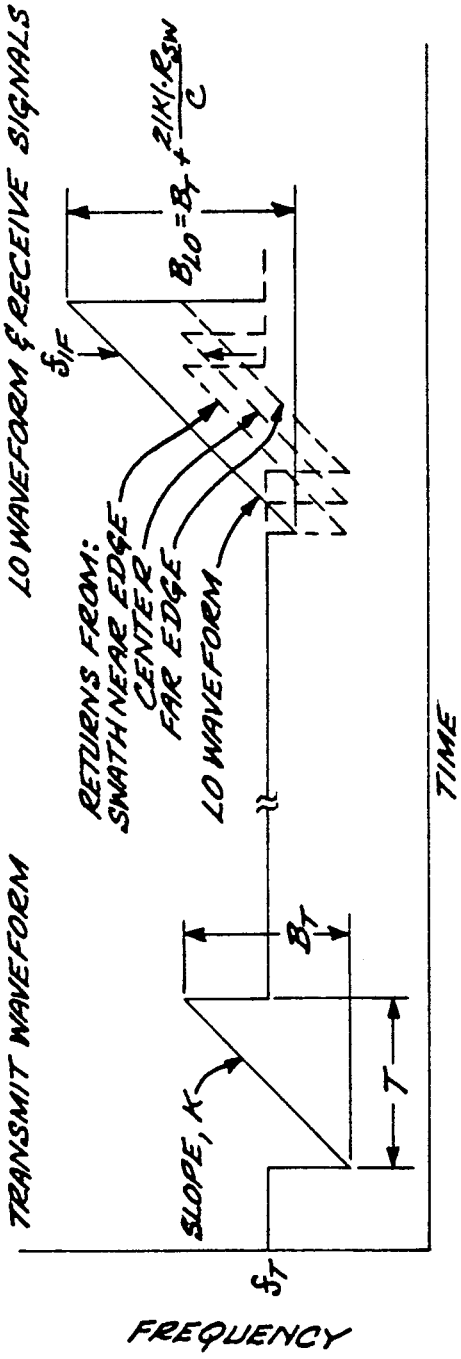
Figure 5:
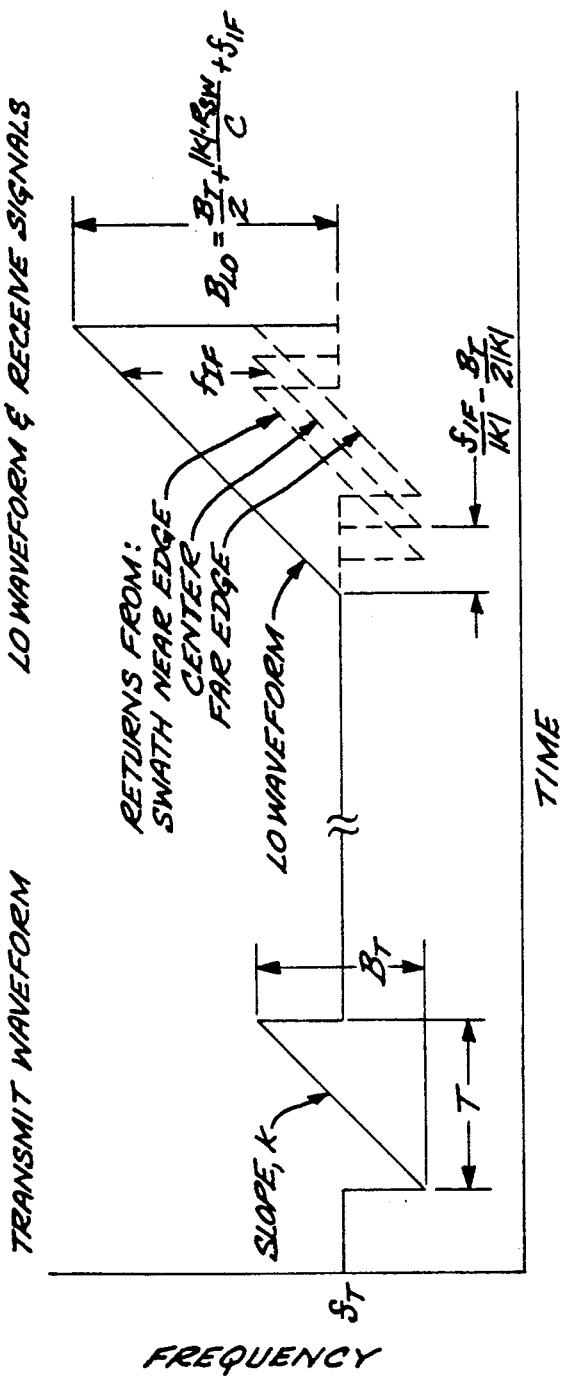

FIGS. 3-5 show two stretch waveform formats in accordance with the present invention that have the characteristics of allowing both the transmit signal and the LO signal to be generated on a common microwave carrier. The waveform format of FIG. 3 uses a modulation format that is not centered on the exciter signal carrier frequency, $f_T$. FIG. 3 shows the modulated signal from which both the transmitter driver and receiver LO signal can be directly derived. During the transmit signal generation, the carrier is modulated with a ramping frequency that begins at $f_T$ and proceeds upward (or downward) at slope K Hz/sec to a total deviation of $B_{LO}$. At the time of arrival of target returns from the range swath of interest, the exciter signal is again modulated at slope K but to a greater deviation bandwidth, $B_{LO}$, to produce the LO waveform. To establish the desired IF in the receiver during receive signal processing, the LO modulation is timed to begin before the arrival of the target returns from the near edge of the swath. Specifically, the LO waveform is started at $f_{IF}/|K|$ prior to the return from the swath center, where $f_{IF}$ is the receiver IF. That timing is shown in FIG. 3 in relation to signal returns from the swath center as well as the swath edges. Alternatively, the LO waveform could step to the desired frequency at the time corresponding to target arrivals from the swath near edge. The LO modulation must continue to the end of the return from the far edge of the swath, resulting in a total LO deviation bandwidth of $$B_{LO} = B_T + (|K| \cdot R_{SW}/c) + F_{IF}$$

where $R_{SW}$ is the range swath width, and c is the speed of light.

FIGS. 4-5 show a modulation format that produces a transmit waveform that is centered on the exciter microwave output carrier frequency. As will be seen, this format results in less LO waveform bandwidth than the non-centered format described above but requires some increase in the complexity of the waveform generation. The transmit waveform is generated by initially stepping or ramping down (or up) to a start frequency that is $B_T/2$ below (or above) the carrier frequency $f_T$. The frequency sweep then proceeds upward (or downward) to span the pulse width, T, and provide a total bandwidth, $B_T$. For the case of $f_{IF} \leq (B_T/2) + (|K| \cdot R_{SW}/c)$ shown in FIG. 4, the LO waveform is timed to begin coincident with the return signals from the near edge of the range swath and ends following returns from the far edge of the swath. The LO start frequency is offset $\pm (f_{IF} - (B_T/2) - (|K| \cdot R_{SW}/c))$ from the carrier frequency and the LO end frequency is $\pm (f_{IF} + (B_T/2) + (|K| R_{SW}/c))$ from the carrier, where the plus (+) sign applies for K positive and the minus (−) sign for K negative. The total swept LO bandwidth is $$B_{LO} = B_T + (2|K| \cdot R_{SW}/c).$$

Since $f_{IF}$ will always be greater than $(|K|\cdot R_{SW}/c)$, $R_{SW}/c)$, the LO bandwidth required for the format of FIG. 4 will always be less than that required for the format of FIG. 3.

The waveform format of FIG. 5 is for the case of $f_{IF} > (B_T/2) + (|K|R_{SW}/c)$ and shows a case where the LO waveform could be made to start $(f_{IF}/|K|) - (B_T/2|K|)$ ahead of the returns from the center of the swath. In this case, the swept LO bandwidth is given by $$B_{LO} = (B_T/2) + (|K|\cdot R_{SW}/c) + F_{IF}$$

which again is always less than the bandwidth required for the FIG. 3 format. Alternatively, the LO waveform can be commanded to a start frequency of $f_T \pm (f_{IF} - (B_T/2) - |K|R_{SW}/c)$ at the time corresponding to the receipt of returns from the swath near edge as described for FIG. 3.

When typical parameters are entered in the LO swept bandwidth equations, it can be shown that the additional bandwidth that is required by this approach is well within the capabilities of current digital swept frequency waveform generators.

NEW CHIRP WAVEFORM FORMAT

Figure 6:
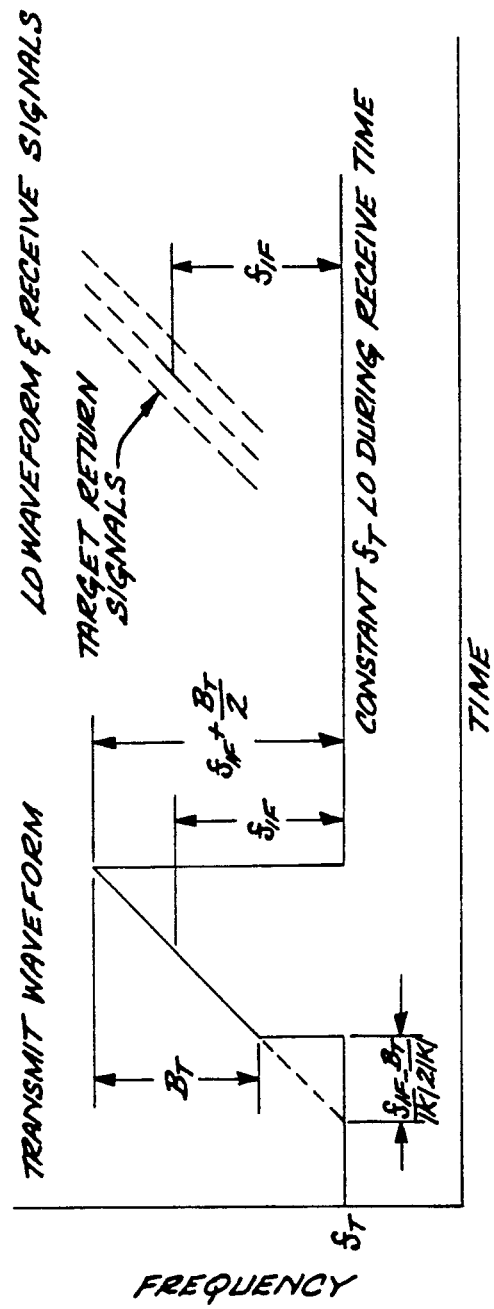
FIG. 6 is a waveform diagram for a chirp waveform in accordance with the invention that allows direct derivation of both the transmitter drive and receiver LO signals from a common signal.

FIG. 6 shows the format for the chirp waveform that allows the direct derivation of both the transmitter drive and receiver LO signals from a common signal. The transmit waveform is generated by beginning the waveform sweep prior to the actual transmit time and gating out the portion shown for transmission. To establish a desired IF for a given transmit bandwidth, $B_T$, the waveform must start $(f_{IF}/|K|) - (B_T/2|K|)$ before the beginning of the transmit pulse. With this timing, the gated transmit waveform will have a center frequency that is $f_{IF}$ above (or below) the exciter carrier frequency, $f_T$, as desired. Alternatively, the waveform generator could be commanded to step to the chirp start frequency of $\pm(f_{IF} - B_T/2)$. Whether the waveform is centered above or below the carrier frequency $f_T$, and whether the plus or minus sign is used depends on the sign of the modulation slope K. For chirp processing, the LO is not modulated during the receive time, and the target return signal will simply be down converted by the $f_T$ carrier to the selected IF.

EXEMPLARY HARDWARE IMPLEMENTATION

The extraction of the transmit and receiver LO waveforms from the stretch and chirp formats of FIGS. 3-6 is straightforward and can be accomplished by an exciter/receiver configuration such as that shown in FIG. 7. The exciter 50 generates the desired microwave carrier frequencies and applies the chirp or stretch frequency modulation. As shown, all exciter functions are referenced to a single crystal oscillator 52, although configurations that use several reference sources may also be used. The frequency synthesizer 54 performs the translation of the reference frequency to the desired microwave region of operation and provides frequency selectivity over that region as required by the particular application. The synthesizer can be as simple as a single frequency multiplier if only one operating frequency is needed or highly complex if a great multiplicity of closely spaced frequencies are needed.

The digital waveform generator 56 that follows the synthesizer performs the waveform modulation in response to parameter control commands and in synchronism with a clock signal from generator 58, shown here to be derived from the master reference oscillator 52. The specific characteristics of these controls and of the clock will depend on the architecture and design of the waveform generator that is used. The waveform generator 56 may be implemented in any configuration that can provide the waveform bandwidth and sweep rate and also be programmed to provide precise control over waveform start time and/or start frequency. A number of digital waveform generator architectures can provide that performance and control, including the generator disclosed in U.S. Pat. No. 4,160,958.

Following the waveform generator, the signal is split into two paths by coupler 60. A microwave gate 62 in the upper path is timed to gate out and pass the transmit waveform to the output amplifier 64 and subsequently to the transmitter or antenna as appropriate. A similar gate 66 in the lower path is timed to gate out and pass the LO waveform to the receiver 70. The timing of the gate control signals would generally be provided by the radar system timing and will depend on the waveform type (chirp or stretch), system PRF, waveform parameters, range to the swath of interest, and swath width. It is seen that both the transmitter drive and receiver LO signals are derived directly from a common exciter microwave signal. That configuration would normally result in zero IF, homodynetype processing in the receiver, which, for the complex magnitude and phase processing that is needed, would require microwave in-phase and quadrature (I/Q) detection. The provision of the high degree of amplitude and phase balance needed for the I/Q detectors would be difficult to achieve at microwave frequencies.

The disclosed new formats for the stretch and chirp waveforms, however, provide a non-zero IF that is set by the selection of the LO waveform parameters. No frequency up or down converters are required to offset the transmitter drive frequency from the receiver LO to establish the IF and only a single modulated microwave signal requires generation in the exciter for substantial savings in the quantity of hardware and cost.

The receiver 70 needed to process the new waveform format is shown in FIG. 7 and contains functions that are typical of a receiver for a reconnaissance application. Microwave input low noise amplification 72 and filtering 74 establish the receiver sensitivity and reject outband interference. An image rejection mixer 76 rejects image noise and signals and converts the target return signals down to the desired IF where additional gain 78 and filtering 80 are provided. Wide range AGC 82 is also typically included in the IF section to establish an optimum signal level into the A/D converters in the back end of the receiver. The in-phase and quadrature (I/Q) LO generator 86 provides two signals at the nominal receiver IF but offset 90 degrees in phase from each other to function as references for the synchronous I/Q detectors 84. Synchronous I/Q detectors 84 convert the IF signal to I and Q video signals, and A/D converters 88 and 90 quantize these signals and convert them to a digital format for subsequent processing.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A radar system having a transmit drive section and a receiver section, characterized in that both the transmit signal and the receiver local oscillator (LO) signal are produced on a common microwave carrier, and wherein a non-sero receiver intermediate frequency (IF) is produced, allowing signal detection at a reasonably low frequency but without the need for additional hardware to generate separate local oscillator operating frequencies that are offset from the transmit frequency, comprising:

means for generating a microwave carrier signal of frequency $f_T$;

digital waveform generator for modulating said carrier signal with a transmit drive waveform during periods of time in which the system is in the transmit mode, and with a LO signal waveform during other periods of time wherein said transmit drive waveform comprises a stretch waveform characterized by a linear ramping frequency that begins at frequency $f_T$ and is of slope K Hz/second, where K may be either positive or negative, to a total deviation of $B_T$;

means for amplifying and transmitting said transmit drive waveform modulated signal during selected periods of time;

means for employing said LO signal waveform modulated signal during other periods of time as the receiver LO signal which is mixed with received returns from said transmitted signals to provide frequency converted receiver signals; and means for processing said frequency converted receiver signals to provide receiver output signals.

2. The system of claim 1 wherein said LO signal waveform is timed to begin before the arrival of the target returns from the near edge of the range swath of interest, and is characterized by a linear ramping frequency that begins at frequency $f_T$ and is of slope K Hz/second to a total deviation $B_{LO}$ which is greater than $B_T$.

3. The system of claim 2 wherein the LO waveform modulation is timed to begin $f_{IF}/|K|$ prior to the return from the swath center, where $f_{IF}$ is the receiver IF frequency.

4. The system of claim 2 wherein said LO signal waveform is commanded to step up or down to the desired frequency at a time coincident with target returns from the near edge of the range swath, and is subsequently characterized by a linear ramping frequency that begins at this frequency and is of slope K Hz/second to a total deviation of $B_{LO}$ which is greater than $B_T$.

5. The system of claim 4 wherein said LO signal waveform modulation is commanded to provide an initial frequency step to $f_T \pm (f_{IF} - |K| R_{SW}/c)$ that is timed to be coincident with target returns from the near edge of the swath, where the plus (+) sign applies for K positive and the minus (−) sign for K negative, $R_{SW}$ is the range swath, and c is the speed of light.

6. The system of claim 1 wherein said transmit drive waveform comprises a stretch waveform characterized by a linear ramping frequency that begins at a frequency which is $B_T/2$ below or above the frequency $f_T$ and is of slope K Hz/second to a total deviation $B_T$ which is centered on about $f_T$.

7. The system of claim 6 wherein said LO frequency is timed to begin coincident with the return signals from the near edge of the range swath of interest and ends following returns from the far edge of the swath, and is characterized by a linear ramping frequency that starts at $f_T \pm (f_{IF} - (B_T/2) - (|K| R_{SW}/c))$, and ends at frequency $f_T \pm (f_{IF} + (B_T/2) + (|K| R_{SW}/c))$, where the plus (+) sign applies for K positive, and the minus (−) sign applies for K negative.

8. The system of claim 7 wherein total swept LO is $B_{LO} = B_T + (2|K| R_{SW}/c)$.

9. The system of claim 6 wherein said LO signal waveform comprises a stretch waveform characterized by a linear ramping frequency which is of slope K Hz/second to a total deviation $B_{LO}$, and is timed to begin $(f_{IF}/|K|) - (B_T/2|K|)$ ahead of the returns from the center of the range swath of interest ($R_{SW}$), wherein the swept LO bandwidth is given by $$B_{LO} = (B_T/2) + (|K| R_{SW}/c) + f_{IF}.$$

10. The system of claim 1 wherein said transmit drive waveform comprises a chirp waveform characterized by a linear ramping frequency K Hz/second which commences $(f_{IF}/|K|) - (B_T/2|K|)$ prior to start of the transmit pulse yet which is only utilized during said transmit pulse, wherein the transmitted modulated signal will have a center frequency that is $f_{IF}$ above or below said carrier frequency $f_T$, where $f_{IF}$ is the desired receiver intermediate frequency and $B_T$ is the transmit bandwidth.

11. The system of claim LO wherein said LO waveform signal is not modulated, wherein the receiver LO signal is a signal at said carrier frequency.

12. The system of claim 1 wherein said transmit drive waveform comprises a chirp waveform characterized by a linear frequency K Hz/second which is commanded to step to a start frequency of $f_T \pm (F_{IF} - B_T/2)$ at a time coincident with the beginning of the transmit pulse, wherein the plus (+) sign applies for K positive and the minus (−) sign for K negative and wherein the transmitted modulated signal will have a center frequency that is $f_{IF}$ above or below said carrier frequency $f_T$ and have a transmit bandwidth of $B_T$.

13. The system of claim 12 wherein said LO waveform signal is not modulated, wherein the receiver LO signal is a signal at the said carrier signal.

14. The system of claim 1 wherein said transmit waveform frequency may be either above or below the LO waveform frequency and wherein the said waveform frequency modulation slope may be either positive or negative.

15. The system of claim 1 wherein said transmit waveform band $B_T$ may be commanded to begin at the carrier frequency $f_T$, be centered about $f_T$, or be placed at other frequency offsets from $f_T$.

16. The system of claim 1 wherein said means for amplifying and transmitting said transmit drive waveform modulated signal comprises a transmit pulse gating circuit response to a transmit gate signal for gating the output of said waveform generator to an amplifier during transmit pulse intervals.

17. The system of claim 1 wherein said means for employing said LO signal waveform modulated signal comprises means for coupling a portion of the energy of said waveform generator output to an LO waveform gating circuit responsive to an LO gate signal for gating said LO waveform modulated signal to said receiver in response to said LO gate signal.

* * * * *